United States Patent [19]
Ima et al.

[11] Patent Number: 5,726,269
[45] Date of Patent: Mar. 10, 1998

[54] POLYPROPYLENE FILM

[75] Inventors: Seiichiro Ima; Eisuke Shiratani; Shigeki Kishiro, all of Ichihara-shi, Japan

[73] Assignee: Sumitomo Chemical Company, Ltd., Osaka, Japan

[21] Appl. No.: 592,705

[22] Filed: Jan. 26, 1996

[30] Foreign Application Priority Data

Jan. 26, 1995 [JP] Japan ................... 7-010797

[51] Int. Cl.$^6$ ............................... C08F 110/06
[52] U.S. Cl. ............................... 526/351; 525/240
[58] Field of Search ............................... 525/240; 526/351

[56] References Cited

U.S. PATENT DOCUMENTS

| | | | |
|---|---|---|---|
| 4,161,574 | 7/1979 | Strametz et al. | 526/159 |
| 4,522,982 | 6/1985 | Ewen | 525/240 |
| 4,668,753 | 5/1987 | Kashiwa et al. | 526/348 |

FOREIGN PATENT DOCUMENTS

| | | |
|---|---|---|
| A10 114 391 | 8/1984 | European Pat. Off. . |
| A10 115 940 | 8/1984 | European Pat. Off. . |
| 0 657 477 A2 | 6/1995 | European Pat. Off. . |
| 0 657 477 A3 | 6/1995 | European Pat. Off. . |
| 26 37 990 A1 | 3/1978 | Germany . |
| 42 42 486 A1 | 6/1994 | Germany . |

*Primary Examiner*—Mark L. Warzel
*Attorney, Agent, or Firm*—Cushman Darby & Cushman IP Group of Pillsbury Madison & Sutro LLP

[57] ABSTRACT

A film having a low dependency of film transparency on film-forming conditions and film thickness, and having superior transparency and rigidity without compromising the original properties of polypropylene film. The film is produced from a polypropylene prepared from a propylene polymer having (1) a stereoirregularity index mmrr/mmmm of a part insoluble in xylene at 20° C. within the range of 0.0095 to 0.0200; (2) a melting temperature within the range of 145° to 160° C.; (3) a part soluble in xylene at 20° C. of 3.5% by weight or less, the polypropylene having: (4) a melt flow rate at 230° C. within the range of 5 to 15 g/10 min.; and (5) a swelling ratio within the range of 1.20 to 1.35.

19 Claims, No Drawings

POLYPROPYLENE FILM

BACKGROUND OF THE INVENTION

1. Field of the Invention

The present invention relates to a polypropylene film. In particular, the present invention relates to an unstretched polypropylene film which has high rigidity and superior transparency with low dependence on film-forming conditions and low dependence on thickness.

2. Background Information

Polypropylene film is widely used in packaging field for food packaging, fiber packaging and the like, because of its excellent optical properties, mechanical properties and packaging aptitude. Recently, in order to enhance productivity, high speed film formation has been carried out by large scale film-forming machines, and film thickness varies due to this expansion of application. Cooling conditions during film formation vary, and as a result the transparency of the film is greatly affected. For example, although the transparency of film with a thickness of about 30μ formed at low speed is good, the transparency of film formed at a high speed (50 m/min, or more) and that of a film with a thickness of 50μ or more is inferior. As a solution to this problem, such measures as decreasing the surface temperature of the cooling roll during film-forming, or directly cooling an extruded melt resin with low temperature water without using a cooling roll and the like have been tried and some improvement obtained. However, the influence of the temperature of the cooling water, variation of flow rate and the like has not been able to be avoided and adequate improvement has not been attained.

In addition, both rigidity and transparency of the film are simultaneously required. A method to produce both rigidity and transparency wherein a sorbitolic nucleating agent is added is disclosed in Japanese Unexamined Patent Publication (Kokai) No. Sho 51-22740 (1976) (corresponding to U.S. Pat. No. 4,016,118, which is incorporated herein by reference). A special method is also disclosed in Japanese Unexamined Patent Publication (Kokai) No. Sho 59-57720 (1984), wherein a melt resin is cooled directly with low temperature water followed by heat-treatment. However, both of these methods have disadvantages. The method blending a sorbitolic nucleating agent causes the odor of the film to worsen, and the method using heat-treatment after cooling with water requires a special apparatus. Furthermore, because the high speed film-forming process is difficult and has a high production cost, its usage is restricted.

Other methods disclosed in Japanese Examined Patent Publication (Kokai) No. Sho 53-15894 (1978) have been tried but have not resulted in a product which has the characteristics of superior transparency and rigidity with low dependency of film transparency on film-forming conditions and thickness.

The present inventors have continued to intensively study the development of polypropylene film which does not have the defects recognized in the aforementioned traditional technology, in order to produce a film having a low dependency of transparency on film-forming conditions and a low dependency of transparency on thickness, and having superior transparency and rigidity.

As a result, the present inventors found that the above-mentioned problems could be overcome by forming film from a polypropylene which is prepared from a propylene polymer having a part insoluble in xylene at 20° C. with a stereoirregularity index in a specified range, a melting point between 145° and 160° C., and a part soluble in xylene at 20° C.; the polypropylene having a melt-flow rate at 230° C. and a swelling ratio in specified ranges, thereby enabling the production of superior film. Because sorbitolic nucleating agent is not used in the present invention, the film is odorless, and it is simple and economical to apply the polymer of the invention to a high speed film-forming process.

SUMMARY OF THE INVENTION

It is an object of the present invention to provide a polypropylene film having a low dependency of film transparency on film-forming conditions and on film thickness, and having superior transparency and rigidity without compromising the other desirable properties of polypropylene film.

It is another object of the present invention to provide a polypropylene film produced by film-forming a polypropylene prepared from a propylene polymer wherein (1) the stereoirregularity index mmrr/mmmm of a part insoluble in xylene at 20° C. is within the range of 0.0095 to 0.0200, (2) the melting temperature is within the range of 145° to 160° C., and (3) a part soluble in xylene at 20° C. is 3.5% by weight or less, and wherein the polypropylene has (4) a melt-flow rate at 230° C. within the range of 5 to 15 g/10 min., and (5) a swelling ratio within the range of 1.20 to 1.35.

The advantages of the polypropylene provided by the present invention are that the transparency of a film obtained by melt-kneading and film-forming the composition of the invention is superior from a low speed film-forming rate of about 5 m/min. to a high speed film-forming rate of about 300 m/min. and further, the film rigidity is excellent.

DETAILED DESCRIPTION OF THE INVENTION

The present invention is explained in detail below.

As a propylene polymer for the present invention, a homopolymer of propylene and a copolymer of propylene, ethylene and/or α-olefin having 4 carbon atoms or more, that is, the so-called random copolymer, can be suitably used. The preparation method of these propylene polymers is not limited to any special conditions. They can be prepared, for example, by a solvent polymerization method wherein an inactive liquid medium is used as a polymerization medium, a bulk polymerization method wherein propylene is used as a polymerization medium, or a gas phase polymerization method wherein a liquid medium is not substantially present.

The catalyst system used for the polymerization is not limited, as long as the polymerization conditions are selected so that the stereoirregularity index mmrr/mmmm of the part insoluble in xylene at 20° C., the melting point, and the part soluble in xylene at 20° C. of the polymer obtained are within the range of the present invention. Examples of such catalyst systems known to those skilled in the art include:

a catalyst system comprising an active titanium trichloride catalyst and an organoaluminum;

a catalyst system comprising an organoaluminum and a complex type active titanium catalyst wherein a solid product obtained by reducing a titanium compound with an organomagnesium compound is treated with an ester compound and is successively treated with titanium tetrachloride, an ether compound and an ester compound;

a catalyst system comprising an active titanium trichloride catalyst obtained by supporting titanium tetrachloride or titanium trichloride on magnesium halide and an organoaluminum;

and the like.

As related to the present invention, the part insoluble in xylene at 20° C. is defined as the part insoluble in xylene at 20° C. obtained by cooling a propylene polymer dissolved in boiling xylene to 20° C. according to a method described in a report published in Macromolecules, 21, 314–319 (1988) by Kakugo et al.

As related to the present invention, the stereoirregularity index is defined as the peak intensity ratio of a pentad rate mmrr (a peak appears at nearly 21.01 ppm based on TMS (tetramethyl silane)) to a pentad rate mmmm (a peak appears at nearly 21.78 ppm based on TMS) in 5 monomers unit of a polypropylene molecule linkage wherein a polymer solution (a polymer concentration of 150 mg/3 ml) of o-dichlorobenzene containing 10% by weight of $C_6D_6$ is measured with 67.5 MHz at 135° C. by EX-270 ($^{13}$C NMR) manufactured by JOEL. Assignments of $^{13}$C-NMR peaks were determined according to a report published in Macromolecules, 13, 687–689 (1975) by A. Zambelli et al.

The propylene polymer provided for the present invention must have a stereoirregularity index mmrr/mmmm of the part insoluble in xylene at 20° C., a melting point and a part soluble in xylene at 20° C. which are within the ranges set forth below. When any one of these items is out of the required range, the results of the present invention cannot be obtained.

First, it is necessary that the stereoirregularity index mmrr/mmmm of the part insoluble in xylene at 20° C. be within the range of 0.0095 to 0.0200, and preferably 0.0100 to 0.0200. When the stereoirregularity index is less than 0.0095, the transparency of the film is insufficient and when the stereoirregularity index is more than 0.0200, the rigidity is insufficient. From the point view of transparency and rigidity, the stereoirregularity index is more preferably 0.0100 to 0.0180.

Next, the propylene polymer provided for the present invention should have a melting point within the range of 145° to 160° C., and preferably 148° to 160° C. When the melting point is less than 145° C., the rigidity of the film is insufficient, and when the melting point is more than 160° C., the transparency is inferior. From the point of view of transparency and rigidity, the melting point is more preferably 150° to 160° C.

Furthermore, the propylene polymer provided for the present invention is a polymer wherein the part soluble in xylene at 20° C. is 3.5% by weight or less. When it exceeds 3.5% by weight, the rigidity of the film is insufficient. The part soluble in xylene at 20° C. is preferably 0.5 to 3.0% by weight and more preferably 1.0 to 3.0% by weight in order to produce the desired rigidity and lubricating property of the film.

The polypropylene film of the present invention is obtained by film-forming the polypropylene prepared from the aforementioned propylene polymer. The polypropylene used in the present invention cannot provide the properties of the present invention when either the melt-flow rate or the swelling ratio is out of the following ranges. The range of the melt-flow rate should be 5 to 15 g/10 min. When it is less than 5 g/10 min., the transparency of the film becomes insufficient and when it exceeds 15 g/10 min., the stability of film formation is insufficient. From the point of the transparency and film-forming stability, the melt-flow rate is preferably within the range of 6.5 to 12 g/10 min. The swelling ratio should be within the range of 1.20 to 1.35. When it is less than 1.20 or more than 1.35, the dependency of the transparency on film-forming conditions and thickness is high, and as a result, the transparency of film formed at high speed or thick film is inferior. The swelling ratio is more preferably within the range of 1.25 to 1.33. From the point of view of transparency, rigidity, and lubricating property of the film, as well as film-forming stability and the like, a polypropylene prepared from a propylene polymer wherein the stereoirregularity index mmrr/mmmm of the part insoluble in xylene at 20° C. is within the range of 0.0010 to 0.0180, the melting point is within the range of 150° to 160° C., and the part soluble in xylene at 20° C. is 0.5 to 3.0% by weight; and wherein the melt-flow rate of the polypropylene at 230° C. is within the range of 6.5 to 12 g/10 min. and the swelling ratio is within the range of 1.25 to 1.33 is specifically preferred.

The preparation method of the polypropylene of the present invention is not particularly restricted as long as the melt-flow rate and the swelling ratio are within the range of the present invention. The preparation can be performed by a method melt-kneading the aforementioned propylene polymer in the presence of an antioxidant with for example, a melt extruder, a Banbury mixer or the like.

In case of a melt-kneading method, a method blending and/or melt-kneading the propylene polymer and an antioxidant under inert gas atmosphere having an oxygen concentration of 1% or less at the resin temperatures of 220° to 290° C. is preferred to enhance transparency and prevent coloring of the film.

A method melt-kneading with an uniaxial or multi-axial melt extruder under nitrogen gas atmosphere at the resin temperature of 220° to 290° C. is preferred.

The polypropylene used in the present invention can be suitably used for the preparation of a melt-extruded film having a thickness of 10 to 200μ prepared under conditions where the film-forming speed is about 5 to 300 m/min. and particularly advantageously used for the preparation of an unstretched film having a thickness of 15 to 50μ under conditions of high speed film formation (80 m/min. or more). In addition, because it has the aforementioned advantageous properties, it can be suitably used for at least a one layer component in the preparation of a multi-layered film in the film-forming method of co-extrusion.

The polypropylene film of the present invention can be prepared by methods usually used in industrial production. If it is prepared by the molding method of melt-extrusion, such as for example, T-die film-forming method, a tubular film-forming method or the like, no specific limitations are necessary. A T-die film-forming method wherein high speed formation of a film with a large-scale film-forming machine is preferred. Where a T-die film-forming method is used, the die temperature should be 200° to 290° C. and water applied as a thermal medium fed to chilled rolls at about 20° to 50° C.

Antioxidants, neutralizers, lubricating agents, antiblocking agents, antistatic agents and the like customarily used can be combined as necessary with the polypropylene and the film of the present invention, without untoward effects. Polypropylene and films thereof are described in Japanese Application No. 7-010797, filed Jan. 26, 1995 the disclosure of which is hereby incorporated by reference.

EXAMPLES

The present invention is illustrated by the Examples which follow but is not intended to be limited thereto. The measurement methods for each item mentioned in the Detailed Description of The Invention and the Examples are as follows:

(1) The stereoirregularity index of the part insoluble in xylene at 20° C. mmrr/mmmm After 5 g of a sample was completely dissolved in 500 ml of boiling xylene, it was cooled to 20° C. and allowed to stand for 4 hours or more. This was then separated into a deposit and a solution, and a part insoluble in xylene at 20° C. (CXIS) was obtained by drying the deposit under reduced pressure at 70° C. for at least 2 hours until the weight was constant. The stereoirregularity index mmrr/mmmm of this CXIS was measured according to the method described herein.

(2) Intrinsic viscosity [η] was measured in tetralin at 135° C. with an Ubbelohde viscometer (3) Comonomer content Ethylene content was determined by the IR spectrum method described in the item "(i) Random copolymer" of Polymer Analysis Handbook (256 pages) (edited by the Japanese Analytical Chemistry Society and Japanese Polymer Analysis Society, and published by Asakura bookseller's, 1985).

Butene-1 content was determined by the IR spectrum method using the following equation Butene-1 content (% by weight)=$1.208K^1$ $K^1$=the absorbance at 767 cm$^{-1}$ (4) Melting temperature (Tm, melting point)

After a test piece of 10 mg was melted for 5 min. at 220° C. under nitrogen atmosphere by using a differential scanning calorie meter (manufactured by Perkin Elmer Company, DSC), temperature was lowered to 40° C. at a rate of 5° C./min. After that, temperature was elevated at a rate of 5° C./min., and the temperature of the maximum peak of the melted endothermic curve obtained was the melting temperature (Tm). (The melting point of indium (In) measured with the present measurement apparatus at an elevation rate of 5° C./min. was 156.6° C.)

(5) The part soluble in xylene at 20° C. (CXS)

After completely dissolving 5 g of a sample in 500 ml of boiling xylene, temperature was lowered to 20° C. and it was allowed to stand for 4 hours or more. Subsequently, this was separated to a deposit and a solution by filtration. The filtrate was dried to a solid and then dried under a reduced pressure at 70° C. to a constant weight. Its weight was measured and the content (% by weight) was determined.

(6) Melt flow rate (MFR) was measured according to JIS K7210, condition 14.

(7) Swelling ratio (SR)

The diameter of the extruded article at the measurement of melt flow rate (MFR) according to JIS K7210, condition 14 was measured and it was determined by the following equation:

$$SR = \frac{\text{Diameter of the extruded article}}{\text{Diameter of the die}}$$

(8) Haze (transparency) was measured according to JIS K7105.

(9) Young's modulus

A test piece with a width of 20 mm was obtained from the vertical direction (MD) and the horizontal direction (TD) of the film with a thickness of 30μ obtained by a method described in the following Example 1 and a S—S curve was measured at a chuck distance of 60 mm and a tension speed of 5 mm/min. with a tensile tester to measure an initial modulus of elasticity. The measured value was represented by the average value of MD and TD.

EXAMPLE 1

Propylene and ethylene were continuously polymerized by using titanium trichloride AA (mfd. by Toho Titanium Company), diethylaluminum chloride, ε-caprolactone as an electron donor and heptane as a solvent in the presence of hydrogen at a polymerization temperature of 65° C., a polymerization pressure of 6 kg/cm$^2$ G and a hydrogen concentration in the gas phase of 1.5 vol. %, using an inner volume 23 m$^3$ polymerization vessel with a stirrer. (It will be appreciated by those of ordinary skill in the art that hydrogen is used as a molecular weight controlling agent. As hydrogen concentration is raised, the intrinsic viscosity corresponding to the molecular weight of polypropylene obtained is smaller. Thus, hydrogen concentration can be adjusted in accordance with the intrinsic viscosity desired.)

The polymer obtained had an intrinsic viscosity of 1.98 dl/g, an ethylene content of 1.0% by weight, a stereoirregularity index of the part insoluble in xylene at 20° C. mmrr/mmmm of 0.0126, a melting point of 155° C. and a part soluble in xylene at 20° C. of 1.4% by weight. Per 100 parts by weight of this polymer powder, 0.05 part by weight of calcium stearate, 0.15 part by weight of Irganox 1010 (mfd. by Ciba Geigy Ltd.), 0.05 part by weight of Sandostab P-EPQ (mfd. by Sandoz Ltd.), 0.08 part by weight of erucic acid amide, 0.10 part by weight of fine powder silica, 0.3 part by weight of Sunwax 131P and 0.006 part by weight of 2,5-dimethyl-2,5-di(tert-butylperoxy) hexane (hereinafter, abbreviated as 2.5H) were added and were mixed with a Henschel mixer under nitrogen atmosphere. This mixture was melt-extruded at a resin temperature of 250° C. to yield a pellet of the polypropylene which had a melt flow rate of 8.2 g/10 min. and a swelling ratio of 1.30. The characteristic values of the polymer powder and the pellet are shown in Table 1.

Subsequently, this pellet of the polypropylene was melt-extruded with a T-die film-forming machine having a 50 mm extruder at a resin temperature of 230° C. and unstretched films with thicknesses of 15μ, 30μ, and 100μ were obtained by cooling with a cooling roll through which water of 30° C. was passed. The film-forming speed was 80 m/min. in case of the film with a thickness of 15μ, 20 m/min. in case of 30μ, and 6 m/min. in case of 100μ. Physical properties of the films obtained are shown in Table 2.

EXAMPLE 2

Polymerization was performed in a similar manner to Example 1 varying the feeding amount of ethylene and the hydrogen concentration in the gas phase. The characteristics of the polymer thus obtained are shown in Table 1. To 100 parts by weight of this polymer powder were added 0.05 parts by weight of calcium stearate, 0.15 parts by weight of Irganox 1010 (mfd. by Ciba Geigy Ltd.), 0.05 parts by weight of Sandostab P-EPQ (mfd. by Sandoz Ltd.), 0.08 parts by weight of erucic acid amide, 0.10 parts by weight of fine powder silica, and 0.006 parts by weight of 2.5H, and this was mixed with a Henschel mixer under nitrogen atmosphere. The mixture was melt-extruded at a resin temperature of 250° C. to yield pellets of the polypropylene. The characteristics of the pellet are shown in Table 1. Using this pellet of polypropylene, films were formed in the same manner as in Example 1. Physical properties of the films obtained are shown in Table 2.

EXAMPLES 3 AND 4

Using Solvay catalyst of M & S Catalyst Company in the preparation of the polymer, polymerization was performed in the similar manner as in Example 1, changing the type of comonomer or feeding amount, polymerization temperature and hydrogen concentration in gas phase to yield polymers with the characteristics shown in Table 1. To 100 parts by weight of the polymer powder were added 0.05 parts by weight of calcium stearate, 0.15 parts by weight of Irganox 1010 (mfd. by Ciba Geigy Ltd.), 0.05 parts by weight of Irgafox 168 (mfd. by Ciba Geigy Ltd.), 0.08 parts by weight of erucic acid amide, 0.10 parts by weight of fine powder silica, and 0.011 parts (Example 3) and 0.005 parts (Example 4) by weight of 2.5H, and this was mixed with a Henschel mixer under nitrogen atmosphere. The mixtures were melt-extruded at a resin temperature of 250° C. to produce pellets of polypropylene. The characteristics of the pellets are shown in Table 1. Using these pellets of polypropylene, films were formed in a similar manner to Example 1. Physical properties of the films obtained are shown in Table 2.

COMPARATIVE EXAMPLE 1

Using a solid catalyst synthesized according to Example 3 of Japanese Examined Patent Publication No. Hei 3-46001 (1991) in the preparation of a polymer, polymerization was performed at a polymerization temperature of 60° C. and a hydrogen concentration of 2.0 vol. % in gas phase in like manner as Example 1 by feeding propylene and ethylene continuously. Characteristics of the polymer are listed in Table 1. Per 100 parts by weight of this polymer powder were added 0.05 parts by weight of calcium stearate, 0.15 parts by weight of Iranox 1010 (mfd. by Ciba Geigy Ltd.), 0.035 parts by weight of Irgafox 168 (mfd. by Ciba Geigy Ltd.), 0.08 parts by weight of erucic acid amide, 0.10 parts by weight of fine powder silica, and 0.014 parts by weight of 2.5H and mixed with a Henschel mixer under nitrogen atmosphere. The mixture was melt-extruded at a resin temperature of 250° C. to produce pellets of the polypropylene. The characteristics of the pellet are shown in Table 1. Using these pellets of polypropylene, films were formed in a similar manner as in Example 1. Physical properties of the films obtained are shown in Table 2.

COMPARATIVE EXAMPLES 2 TO 6

Using the solid catalyst used in Examples 1 and 3 in the preparation of the polymer, polymerization was performed in the similar manner as in Example 1 varying the feeding amount of ethylene, polymerization temperature and the hydrogen concentration in gas phase and polymers having the characteristics shown in Table 1 were obtained. The pellets of polypropylene were mixed and melt-extruded in a similar manner to Example 3 but changing the blending amount of 2.5H (0.006 parts by weight in Comparative Example 2, 0.018 parts by weight in Comparative Example 3, 0.002 parts by weight in Comparative Example 4, 0.012 parts by weight in Comparative Example 5 and 0.002 parts by weight in Comparative Example 6). The characteristics of the pellets are shown in Table 1. Using these pellets of the polypropylene, films were formed in the similar manner to Example 1. Physical properties of the films obtained are shown in Table 2.

EXAMPLE 5

Using a pellet of the polypropylene of Example 1, a single layer film with a thickness of 30μ was formed at a speed of 150 m/min. by melt-extruding at 240° C. with a T-die film-forming machine having one 90 mm Φ extruder and two 65 mm Φ extruders and cooling with a cooling roll wherein water of 40° C. was passed. The transparency (haze) of the film obtained was 2.5%.

EXAMPLE 6

Using a pellet of the polypropylene of Example 2, a single layer film with a thickness of 30μ was formed at a speed of 130 m/min. by melt-extruding at 240° C. with a T-die film-forming machine having one 90 mm Φ extruder and two 65 mm Φ extruders and cooling with a cooling roll wherein water of 40° C. was passed. The transparency (haze) of the film obtained was 3.0%.

COMPARATIVE EXAMPLE 7

Using a pellet of the polypropylene of Comparative Example 1, a single layer film with a thickness of 30μ was formed in the similar manner as in Example 5. The transparency (haze) of the film obtained was 3.8% and inferior in comparison with Examples made according to the present invention.

TABLE 1

POLYMERIZATION RESULT

| Examples | [η] | Comonomer Ethylene | Content Butene-1 | mmmr/mmmm of CXIS part | Tm | CXS | MFR | SR |
|---|---|---|---|---|---|---|---|---|
| Comparative Examples | dl/g | Wt % | Wt % | | C° | Wt % | g/10 min | |
| Example 1 | 1.98 | 1.0 | 0 | 0.0126 | 155 | 1.4 | 8.2 | 1.30 |
| Example 2 | 2.01 | 0.6 | 0 | 0.0145 | 157 | 1.5 | 7.7 | 1.28 |
| Example 3 | 2.10 | 1.4 | 0.9 | 0.0113 | 154 | 2.8 | 8.1 | 1.26 |
| Example 4 | 1.83 | 2.5 | 0 | 0.0107 | 148 | 1.8 | 9.9 | 1.32 |
| Comparative Example 1 | 2.15 | 0.8 | 0 | 0.0086 | 157 | 2.9 | 9.0 | 1.22 |
| Comparative Example 2 | 2.18 | 1.1 | 0 | 0.0113 | 157 | 2.9 | 4.3 | 1.28 |
| Comparative Example 3 | 2.18 | 1.1 | 0 | 0.0113 | 157 | 2.9 | 11.0 | 1.17 |

TABLE 1-continued

POLYMERIZATION RESULT

| Examples | [η] | Comonomer Ethylene | Content Butene-1 | mmrr/mmmm of CXIS part | Tm | CXS | MFR | SR |
|---|---|---|---|---|---|---|---|---|
| Comparative Example 4 | 1.83 | 2.5 | 0 | 0.0107 | 148 | 1.8 | 8.1 | 1.38 |
| Comparative Example 5 | 2.09 | 0 | 0 | 0.0101 | 162 | 3.2 | 9.3 | 1.28 |
| Comparative Example 6 | 1.80 | 3.3 | 0 | 0.0110 | 144 | 2.5 | 6.7 | 1.32 |

TABLE 2

Film Property

| Run No. | Haze % 15μ | 30μ | 100μ | Young's Modulus kg/cm$^2$ |
|---|---|---|---|---|
| Example-1 | 1.8 | 1.2 | 1.7 | 6400 |
| Example-2 | 2.1 | 1.0 | 2.6 | 6500 |
| Example-3 | 1.5 | 0.9 | 2.3 | 6200 |
| Example-4 | 1.2 | 1.4 | 2.7 | 5600 |
| Comparative Example-1 | 1.6 | 1.4 | 4.0 | 6400 |
| Comparative Example-2 | 2.1 | 2.0 | 6.7 | 6300 |
| Comparative Example-3 | 2.7 | 1.1 | 3.2 | 6200 |
| Comparative Example-4 | 2.4 | 2.0 | 4.4 | 5600 |
| Comparative Example-5 | 2.1 | 1.6 | 3.9 | 7000 |
| Comparative Example-6 | 2.6 | 2.4 | 3.0 | 4700 |

The previous examples and comparative examples demonstrate that a polypropylene prepared from the propylene polymer of the present invention can be used to produce unstretched polypropylene film having a low dependency of film transparency on film-forming conditions and film thickness. The invention thereby enables the production of thick films and the use of high speed film-forming processes to obtain film of superior quality by melt extrusion methods. References cited herein are hereby incorporated by reference.

What is claimed is:

1. A polypropylene film produced by film-forming a polypropylene, wherein said polypropylene is prepared from a propylene polymer having:
   (a) a stereoirregularity index mmrr/mmmm of a part insoluble in xylene at 20° C. within the range of 0.0095 to 0.0200;
   (b) a melting temperature within the range of 145° to 160° C.;
   (c) a part soluble in xylene at 20° C. of 3.5% by weight or less, and wherein said polypropylene has:
   (a) a melt-flow rate at 230° C. under a load of 2.16 kgf within the range of 5 to 15 g/10 min.; and
   (b) a swelling ratio within the range of 1.20 to 1.35.

2. The polypropylene film according to claim 1, wherein the propylene polymer has a stereoirregularity index mmrr/mmmm of a part insoluble in xylene at 20° C. within the range of 0.0100 to 0.0200.

3. The polypropylene film according to claim 1, wherein the melting temperature of the propylene polymer is within the range of 148° to 160° C.

4. The polypropylene film according to claim 1, wherein the part soluble in xylene at 20° C. in the propylene polymer is within the range of 0.5 to 3.0% by weight.

5. The polypropylene film according to claim 1, wherein the melt flow rate at 230° C. of the polypropylene is within the range of 6.5 to 12 g/10 min., and the swelling ratio of the polypropylene is within the range of 1.25 to 1.33.

6. The polypropylene film according to claim 1, wherein the polypropylene film is an unstretched polypropylene film.

7. A polypropylene prepared from a propylene polymer having:
   (a) a stereoirregularity index mmrr/mmmm of a part insoluble in xylene at 20° C. within the range of 0.0095 to 0.0200;
   (b) a melting temperature within the range of 145° to 160° C.; and
   (c) a part soluble in xylene at 20° C. of 3.5% by weight or less;
   wherein said polypropylene has:
   (a) a melt-flow rate at 230° C. under a load of 2.16 kgf within the range of 5 to 15 g/10 min.; and
   (b) a swelling ratio within the range of 1.20 to 1.35.

8. The polypropylene according to claim 7, wherein the propylene polymer has a stereoirregularity index mmrr/mmmm of a part insoluble in xylene at 20° C. is within the range of 0.0100 to 0.0200.

9. The polypropylene according to claim 7, wherein the melting temperature of the propylene polymer is within the range of 148° to 160° C.

10. A polypropylene according to claim 7, wherein the part soluble in xylene at 20° C. in the propylene polymer is within the range of 0.5 to 3.0% by weight.

11. A polypropylene according to claim 7, wherein the melt flow rate at 230° C. of the polypropylene is within the range of 6.5 to 12 g/10 min., and the swelling ratio of the polypropylene is within the range of 1.25 to 1.33.

12. A film-forming method comprising melt-extruding the polypropylene of claim 7 so that a polypropylene film is produced.

13. The method of claim 12 wherein said polypropylene film has a thickness between about 10 and 200μ.

14. The method of claim 13 wherein said polypropylene film has a thickness of at least 50μ.

15. The method of claim 12 wherein a film-forming speed between about 5 m/min. and 300 m/min. is used.

16. The method of claim 15 wherein a film-forming speed of at least 80 m/min. is used.

17. The method of claim 16 wherein the polypropylene film has a thickness of 15–50μ.

18. The method of claim 12 wherein melt extrusion is carried out using a T-die film-forming machine.

19. The method of claim 18 wherein die temperature is between about 200° C. and 290° C.

* * * * *